United States Patent
Dumais et al.

(10) Patent No.: US 7,293,019 B2
(45) Date of Patent: Nov. 6, 2007

(54) PRINCIPLES AND METHODS FOR PERSONALIZING NEWSFEEDS VIA AN ANALYSIS OF INFORMATION NOVELTY AND DYNAMICS

(75) Inventors: Susan T. Dumais, Kirkland, WA (US); Eric J. Horvitz, Kirkland, WA (US); Evgeniy Gabrilovich, Herzlia (IL)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 10/827,729

(22) Filed: Apr. 20, 2004

(65) Prior Publication Data

US 2005/0198056 A1   Sep. 8, 2005

Related U.S. Application Data

(60) Provisional application No. 60/549,371, filed on Mar. 2, 2004.

(51) Int. Cl.
*G06F 17/30* (2006.01)
*G06F 7/00* (2006.01)

(52) U.S. Cl. .................. 707/5; 707/6; 707/101
(58) Field of Classification Search .............. 707/4, 707/5, 6, 101; 704/1, 4
See application file for complete search history.

(56) References Cited

U.S. PATENT DOCUMENTS

| | | | |
|---|---|---|---|
| 5,384,892 A * | 1/1995 | Strong | 704/243 |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,625,814 A * | 4/1997 | Luciw | 707/5 |
| 5,812,865 A | 9/1998 | Theimer et al. | |
| 6,167,398 A * | 12/2000 | Wyard et al. | 707/5 |

(Continued)

FOREIGN PATENT DOCUMENTS

| | | |
|---|---|---|
| EP | 1 378 838 A | 1/2004 |
| WO | 9800787 | 1/1998 |

OTHER PUBLICATIONS

Evgeniy Gabrilovich, et al., Newsjunkie: Providing Personalized Newsfeeds via Analysis of Information Novelty, WWW2004, May 17-22, 2004, 9 pages.

(Continued)

*Primary Examiner*—Kuen S. Lu
(74) *Attorney, Agent, or Firm*—Amin, Turocy & Calvin, LLP

(57) ABSTRACT

A system and methodology is provided for filtering temporal streams of information such as news stories by statistical measures of information novelty. Various techniques can be applied to custom tailor news feeds or other types of information based on information that a user has already reviewed. Methods for analyzing information novelty are provided along with a system that personalizes and filters information for users by identifying the novelty of stories in the context of stories they have already reviewed. The system employs novelty-analysis algorithms that represent articles as a bag of words and named entities. The algorithms analyze inter- and intra-document dynamics by considering how information evolves over time from article to article, as well as within individual articles.

39 Claims, 13 Drawing Sheets

U.S. PATENT DOCUMENTS

| | | | |
|---|---|---|---|
| 6,418,431 B1* | 7/2002 | Mahajan et al. | 707/4 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,801,917 B2* | 10/2004 | Gutta et al. | 707/102 |
| 6,812,937 B1 | 11/2004 | Abbott et al. | |
| 6,842,877 B2 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0007364 A1 | 1/2002 | Kobayashi et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0088397 A1* | 5/2003 | Karas et al. | 704/1 |
| 2003/0154476 A1 | 8/2003 | Abbott, III et al. | |
| 2004/0162729 A1* | 8/2004 | Strong | 704/259 |
| 2005/0034078 A1 | 2/2005 | Abbott et al. | |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

International Search Report dated Jul. 22, 2005 for PCT Application Serial No. DP 05 10 1400, 3 Pages.

Thorsten Brants, et al. A System for New Event Detection. Proceedings of the 26th Annual International ACM Sigir Conference on Research and Development in Information Retrieval; Toronto, Canada. Jul. 26-Aug. 1, 2003. Jul. 2003, pp. 330-337, ACM Press, NY.

Yiming Yang, et al. Topic-conditioned Novelty Detection. Proceedings of the Eigth ACM Sigkdd International Conference on Knowledge Discovery and Data Mining; Edmonton, Alberta, CA. Jul. 23-26, 2002. Jul. 2002, p. 688-693. ACM Press NY.

James Allan, et al. On-line New Event Detection and Tracking. Proceedings of the 21st Annual International ACM Sigir Conference on Research and Development in Information Retrieval. Melbourne, Australia. Aug. 24-28, 1998, pp. 37-45. ACM Press, NY.

James Allan, Rahul Gupta, and Vikas Khandelwal, Temporal Summaries of News Topics, Proceedings of the 24th International Conference on Research and Development in Information Retrieval, Sep. 9-12, 2001, pp. 10-18, New Orleans, Louisiana, USA.

Curt Burgess, Kay Livesay, and Kevin Lund, Explorations in Context Space: Words, Sentences, Discourse, Disclosure Processes, 1998, pp. 211-258.

Jaime Carbonell and Jade Goldstein, The Use of MMR, Diversity-Based Reranking for Reordering Documents and Producing Summaries, Proceedings of the 21st International Conference on Research and Development in Information Retrieval, 1998, pp. 335-336, Melbourne, Australia.

Kevyn Collins-Thompson, Paul Ogilvie, Yi Zhang, Jamie Callan, Information Filtering, Novelty Detection, and Named-Page Finding, Proceedings of the 11th Text Retrieval Conference, 2002, 12 pages.

Thomas M. Cover and Joy A. Thomas, Elements of Information Theory, 1991, 545 pages, John Wiley & Sons, Beijing, China.

Steve Cronen-Townsend and W. Bruce Croft, Quantifying Query Ambiguity, Proceedings of the Human Language Technology Conference, Mar. 2002, pp. 94-98, San Diego, CA, USA.

Steve Cronen-Townsend, Yun Zhou, and W. Bruce Croft, Predicting Query Performance, Proceedings of the 25th International Conference on Research and Development in Information Retrieval, Aug. 11-15, 2002, pp. 299-306, Tampere, Finland.

Scott Deerwester, Susan T. Dumais, and Richard Harshman, Indexing by Latent Semantic Analysis, Journal of the American Society For Information Science, 1990, pp. 391-407, vol. 41.

Fred Douglis, Thomas Ball, Yih-Farn Chen, and Eleftherios Koutsofios, The AT&T Internet Difference Engine: Tracking and Viewing Changes on the Web, World Wide Web, Jan. 1998, pp. 27-44.

Christiane Fellbaum, WordNet: An Electronic Lexical Database, 1998, 423 pages, MIT Press.

Lev Finkelstein, Evgeniy Gabrilovich, Yossi Matias, Ehud Rivlin, Zach Solan, Gadi Wolfman, and Eytan Ruppin, Placing Search in Context: The Concept Revisited, ACM Transactions on Information Systems, Jan. 2002, pp. 116-131, vol. 20, No. 1.

Lev Finkelstein, Evgeniy Gabrilovich, Yossi Matias, Ehud Rivlin, Zach Solan, Gadi Wolfman, and Eytan Ruppin, Placing Search in Context: The Concept Revisited, ACM Transactions on Information Systems, May 1-5, 2001, pp. 406-414, Hong Kong.

Rafael C. Gonzalez and Paul Wintz, Digital Image Processing, Second Edition, 1987, 503 pages, Addison-Wesley.

Donna Harman, Overview of the TREC 2002 Novelty Track, Proceedings of the 11th Text Retrieval Conference, 2002, pp. 46-55, ACM Press.

Eric Horvitz, Carl Kadie, Tim Paek, and David Hovel, Models of Attention in Computing and Communication: From Principles to Applications, Communications of the ACM, Mar. 2003, pp. 52-59, vol. 46, Issue 3.

Adam Kilgarriff, Comparing Corpora, International Journal of Corpus Linguistics, 2001, pp. 97-133, vol. 6, Issue 1, John Benjamins Publishing Co.

Jon Kleinberg, Bursty and Hierarchical Structure in Streams, Proceedings of the 8th International Conference on Knowledge Discovery and Data Mining, 2002.

Lillian Lee, Measures of Distributional Similarity, Proceedings of the 37th Annual Meeting of the ACL, 1999, 9 pages.

Christopher D. Manning and Hinrich Schutze, Foundations of Statistical Natural Language Processing, 1999, 679 pages, MIT Press.

J. Ross Quinlan, C4.5: Programs for Machine Learning, 1993, 302 pages, Morgan Kaufmann Publishers.

Philip Resnick, Semantic Similarity in a Taxonomy: An Information-Based Measure and its Application to Problems of Ambiguity in Natural Language, Journal of Artificial Intelligence Research, 1999, pp. 95-130, vol. 11.

Eric Sven Ristad, A Natural Law of Succession, Technical Report CS-TR-495-95, 1995, Princeton University, 25 pages.

Gerard Salton and Christopher Buckley, Term-Weighting Approaches in Automatic Text Retrieval, Information Processing and Management, 1988, pp. 513-523, vol. 24, No. 5.

Barry Schiffman, Ani Nenkova, Kathleen McKeown, Experiments in Multidocument Summarization, Proceedings of the Human Language Technology Conference, Mar. 2002, San Diego, California, USA.

Russell Swan and David Jensen, TimeMines: Constructing Timelines with Statistical Models of Word Usage, Proceedings of the ACM SIGKDD 2000 Workshop on Text Mining, 2000, pp. 73-80.

Frank Wilcoxon, Individual Comparisons by Ranking Methods, Biometrics Bulletin, Dec. 1945, pp. 80-83, vol. 1, No. 6, International Biometric Society.

Yiming Yang, Thomas Ault, and Thomas Pierce, Combining Multiple Learning Strategies for Effective Cross Validation, Proceedings of the 17th Annual Conference on Machine Learning, 2000, pp. 1167-1182.

T. Joachims, Text categorization with support vector machines: learning with many relevant features, Machine Learning, European Conference on Machine Learning, Apr. 21, 1998, pp. 134-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

On topic, elaboration: SARS patient's wife held under quarantine

Offshoot: Swiss company developed SARS vaccine

On-topic, recap

Offshoot: SARS impact on Asian stock markets

PRINCIPLES AND METHODS FOR PERSONALIZING NEWSFEEDS VIA AN ANALYSIS OF INFORMATION NOVELTY AND DYNAMICS

RELATED APPLICATION

This application claims priority to U.S. Provisional Patent Application Ser. No. 60/549,371 filed on, Mar. 2, 2004 and entitled PRINCIPLES AND METHODS FOR PERSONALIZING NEWSFEEDS VIA AN ANALYSIS OF INFORMATION DYNAMICS, the entire contents of which are herein incorporated by reference.

TECHNICAL FIELD

The present invention relates generally to computer systems and more particularly, the present invention relates to systems and methods that personalize temporal streams of information such as news via an automated analysis of information dynamics.

BACKGROUND OF THE INVENTION

Just a decade ago, large-scale flows of information such as news feeds were owned, monitored, and filtered by organizations specializing in the provision of news. The Web has brought the challenges and opportunities of managing and absorbing news feeds to all interested users. Identifying "important" information has been an essential aspect of studies on Web search and text summarization. Search methods focus on identifying a set of documents that maximally satisfies a user's acute information needs. Summarization strives at compressing large quantities of text into a more concise formulation. In the absence of automated methods for identifying the deep semantics associated with text, prior work in summarization has typically operated at the level of complete sentences, weaving together the most representative sentences to create a document summary. Research on search and summarization has generally overlooked the dynamics of informational content arriving continuously over time.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods for identifying information novelty and on how these methods can be applied to manage information content that evolves over time. A general framework is provided for comparing collections of documents, whereby documents can be assumed to be organized into groups by their content or source, and analyzed for inter-group and intra-group differences and commonalities. For example, juxtaposing two groups of documents devoted to the same topic but derived from two distinct sources, e.g., news coverage of an event in different parts of the world can reveal interesting differences of opinions and overall interpretations of situations. Moving from static collections to sets of articles generated over time, the evolution of content can be examined. For example, a stream of news articles can be examined over time on a common story, with the goal of highlighting truly informative updates and filtering out a large mass of articles that largely relay "more of the same."

Detailed statistics can be gathered on word occurrence across sets of documents in order to characterize differences and similarities among these sets. Various word models can be enhanced by extracting named entities that denote names of people, organizations, and geographical locations, for example. In contrast to phrases and collocations—whose discriminative semantic properties are usually outweighed by lack of sufficient statistics—named entities identify relatively stable tokens that are used in a common manner by many writers on a given topic, and thus their use contributes a considerable amount of information. For example, one type of analysis provided represents articles using the named entities found in them. Analysis can be focused on live streams of news or other topics. Live news streams pose tantalizing challenges and opportunities for research. News feeds span enormous amounts of data, present a cornucopia of opinions and views, and include a wide spectrum of formats and content from short updates on breaking news, to major recaps of story developments, to mere reiterations of "the same old facts" reported over and over again.

Algorithms can be developed that identify significant updates on stories being tracked, relieving the users from having to sift through long lists of similar articles arriving from different sources. The methods provided in accordance with the present invention provide the basis for personalized news portal and news alerting services that seek to minimize the time and disruptions to users who desire to follow evolving news stories.

The subject invention provides various architectural components for analyzing information and filtering content for users. First, a framework is provided for identifying differences in sets of documents by analyzing the distributions of words and recognized named entities. This framework can be applied to compare individual documents, sets of documents, or a document and a set (for example, a new article vs. the union of previously reviewed news articles on the topic). Second, a collection of algorithms that operate on live news streams (or other temporally evolving streams) provide users with a personalized news experience. These algorithms have been implemented in an example system called News Junkie that presents users with maximally informative news updates. Users can request updates per user-defined periods or per each burst of reports about a story. Users can also tune the desired degree of relevance of these updates to the core story, allowing delivery of offshoot articles that report on related or similar stories. Also, an evaluation method is provided which presents users with a single seed story and sets of articles ranked by different novelty-assessing metrics, and seeks to understand how participants perceive the novelty of these sets in the context of the seed story.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIGS. 8-11 illustrate example user interfaces in accordance with an aspect of the present invention.

DETAILED DESCRIPTION OF THE INVENTION

Figure 1:
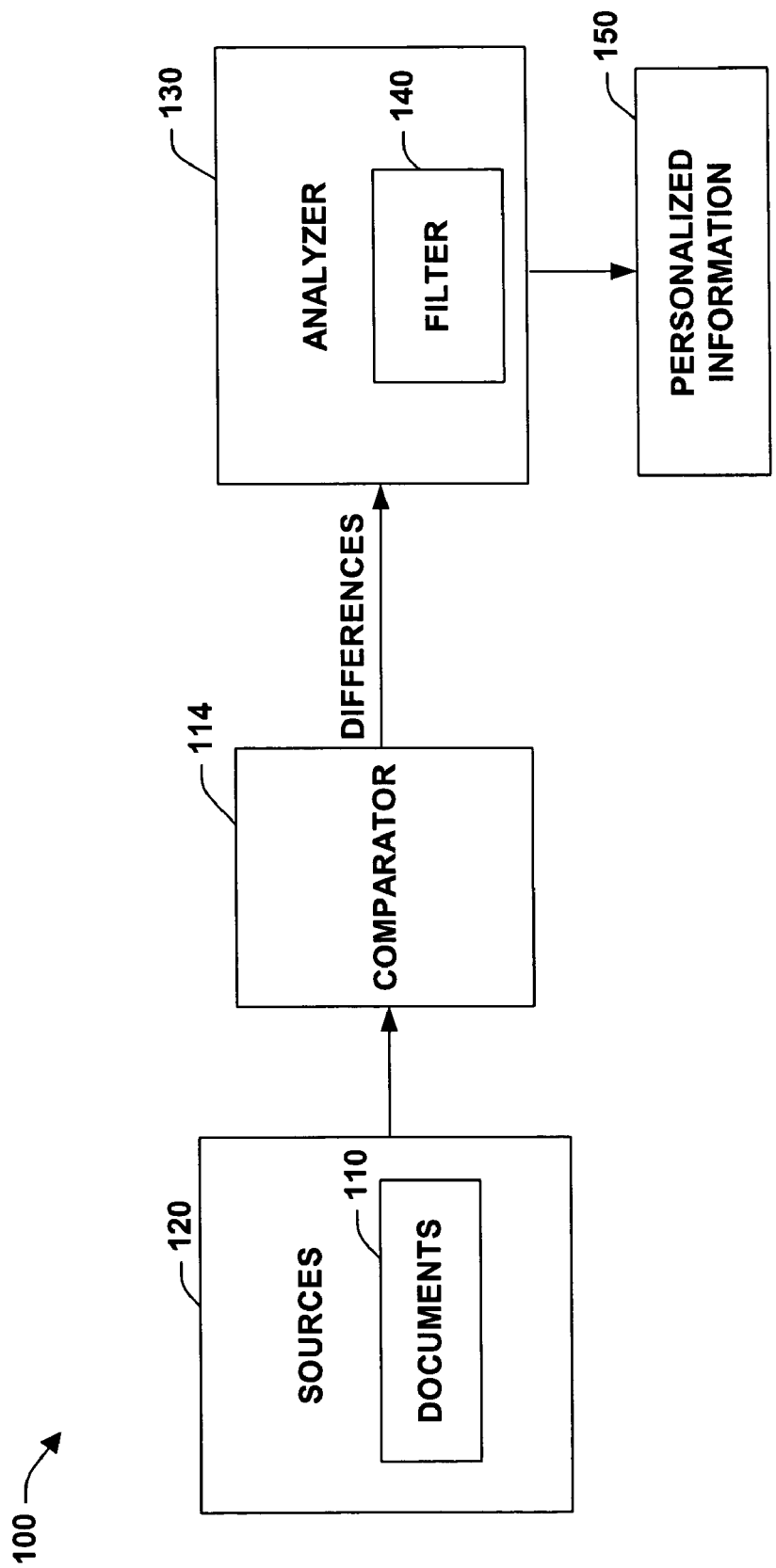
FIG. 1 is a schematic block diagram illustrating an information dynamics system in accordance with an aspect of the present invention.

The present invention relates to a system and method to identify information novelty and manage information content as it evolves over time. In one aspect, a system is provided for distributing personalized information. The system includes a component that determines differences between two or more information items. An analyzer automatically determines a subset of the information items based in part on the determined differences and as data relating to the information items evolves over time. Also, various methods are provided. In one aspect, a method for creating personalized information includes automatically analyzing documents from different information sources and automatically determining novelty of the documents. A personalized feed of information is then provided to the user based on the novelty of the documents.

The systems and methods of the present invention can be applied to a plurality of different applications. These can include applications that assist with the design of ideal reading sequences or paths through currently unread news stories on a topic, within different time-horizons of recency from present time. For designing sequences for catching up on news, applications consider the most recent news as well as news bursts over time, to help people understand the evolution of a news story and navigate the history of stories by major events/updates. Other applications include developing different types of display designs and metaphors, such as the use of a time-line view or other aspects such as the notion of clusters in time. With respect to ideal alerting in desktop and mobile settings of breaking news stories within a topic, one application allows users to specify topics, or keywords, but only alerting when there is enough novelty given what the user has read. For keyword based methods, alerts can be provided when a news story appears with keywords if the information novelty is great enough, thus being more useful than simple keyword-centric alerting schemes.

As used in this application, the terms "component," "object," "analyzer," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring initially to FIG. 1, an information dynamics system 100 is illustrated in accordance with an aspect of the present invention. The present invention provides systems and methods for identifying information novelty and on how these methods can be applied to manage information content that evolves over time. A general framework 100 is provided for comparing collections of documents 110 via a comparator 114, whereby documents can be organized into groups by their content or source 120, and analyzed by an analyzer 130 for inter-group and intra-group differences and commonalities. For example, juxtaposing two or more groups of documents or files devoted to the same topic but derived from two distinct sources, e.g., news coverage of an event in different parts of the world, can reveal interesting differences of opinions and overall interpretations of situations. Moving from static collections to sets of articles generated over time, the evolution of content can be examined. For example, a stream of news articles can be examined over time on a common story, with the goal of highlighting truly informative updates and filtering out a large mass of articles via a filter 140 that cooperates with the analyzer 130 to deliver personalized information at 150.

Detailed statistics can be gathered on word occurrence across sets of documents in order to characterize differences and similarities among these sets. A model based on words can be enhanced by extracting named entities that denote names of people, organizations, and geographical locations, for example. In contrast to phrases and collocations—whose discriminative semantic properties are usually outweighed by lack of sufficient statistics—named entities identify relatively stable tokens that are used in a common manner by many writers on a given topic, and so their use contributes a considerable amount of information. One type of analysis provided represents articles using the named entities found in them. Analysis can be focused on live streams of news or other temporal streams of data. In one example news feeds span enormous amounts of data, present a plurality of opinions and views, and include a wide spectrum of formats and content from short updates on breaking news, to major recaps of story developments, to mere reiterations of old facts reported over and over again.

Algorithms which are described in more detail below can be provided in the comparator 114, analyzer 130 and/or filter 140 that identify updates on stories or streams being tracked, relieving users from having to sift through long lists of similar articles arriving from different news sources. Various methods provide the basis for a personalized news portal and news alerting services at 150 that seek to minimize the time and disruptions to users who desire to follow evolving stories. It is to be appreciated that although one example aspect of the present invention can be applied to analyzing and filtering information such as news, substantially any temporally evolving stream of information can be processed in accordance with the present invention. Also, data can be collected from a plurality of different information sources such as from a user's laptop, mobile device, desktop computer, wherein such data can be cached (e.g., centralized server) and analyzed according to what data the user has previously observed. As can be appreciated information can be generated from a plurality of sources such as from the Internet, for example, or in local contexts such as an internal company Intranet.

Figure 2:
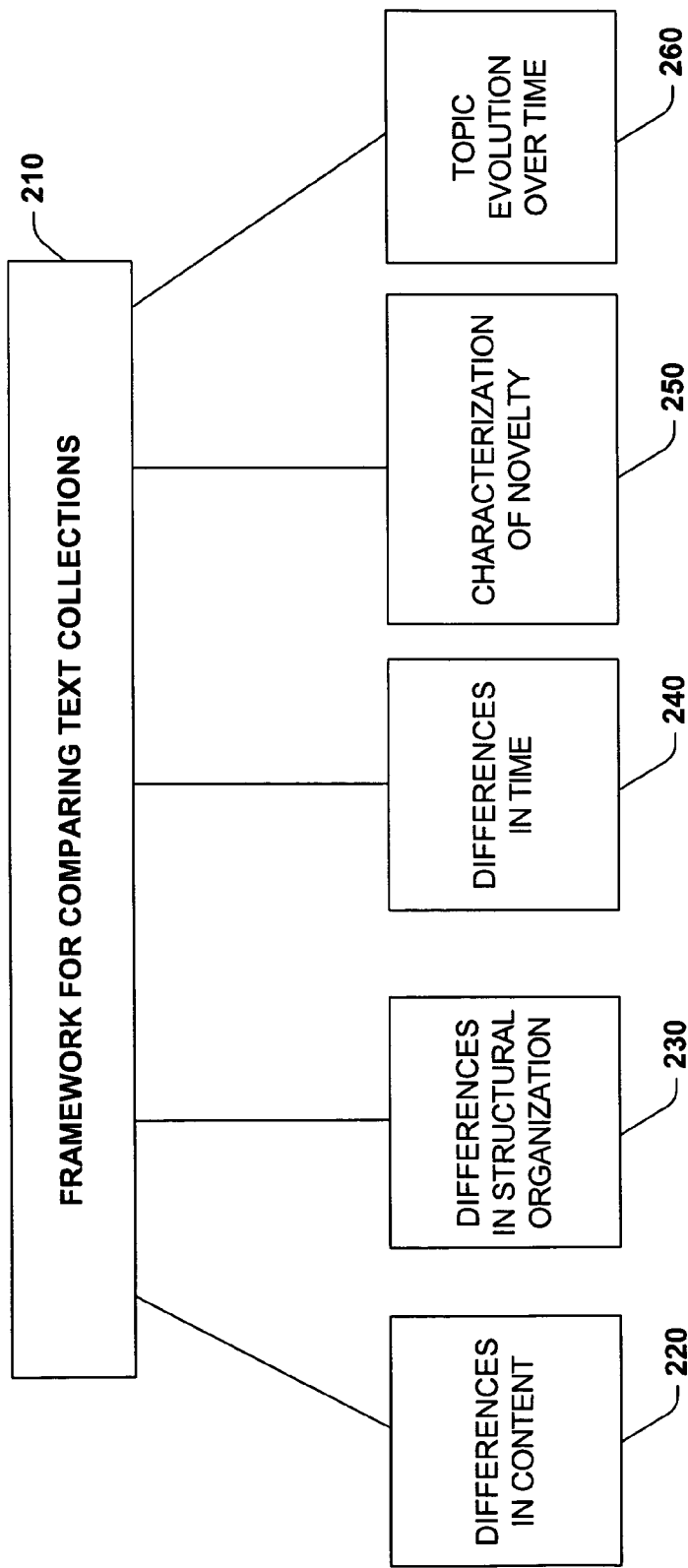
FIG. 2 is a block diagram illustrating a framework for comparing text collections in accordance with an aspect of the present invention.

Referring now to FIG. 2, a framework 210 for comparing text collections is illustrated in accordance with an aspect of the present invention. Given two or more sets of textual content, it is to be determined how differences are characterized between the sets. Determining differences is useful in a variety of applications, including automatic profiling and comparison of text collections, automatic identification of different views, scopes and interests reflected in the texts, and automatic identification of novel information. In general, several aspects of "difference" may be investigated as follows:

At 220, differences in content may reflect the different ways a particular person or event is described in sets of documents. For example, consider analyzing differences in predefined partitions, e.g., comparing US vs. European reports on various political issues, or comparing the coverage of the blackout of the East Coast of the United States in the news originating from sources based in the East Coast and West Coast.

At 230, differences in structural organization may go well beyond text and also consider link structure of Web sites, e.g., comparing IBM Web site vs. Intel Web site.

At 240, Differences in time (i.e., temporal aspects of content differences) can reveal interesting topical changes in series of documents. This type of analysis can be used to compare today's news vs. the news published a month or a year ago, to track changes in search engine query logs over time, or to identify temporal changes in topics in users' personal email.

Temporal differences include automatically assessing the novelty over time of news articles (or other type information) originating from live news feeds. Specifically, the following aspects are considered:

At 250, characterization of novelty in news stories, allows ordering news articles so that each article adds maximum information to the (union of) previously read or presented items.

At 260, topic evolution is analyzed over time, which enables quantifying importance and relevance of news updates, granting end users control over these parameters and offering them a personalized news experience.

Figure 3:
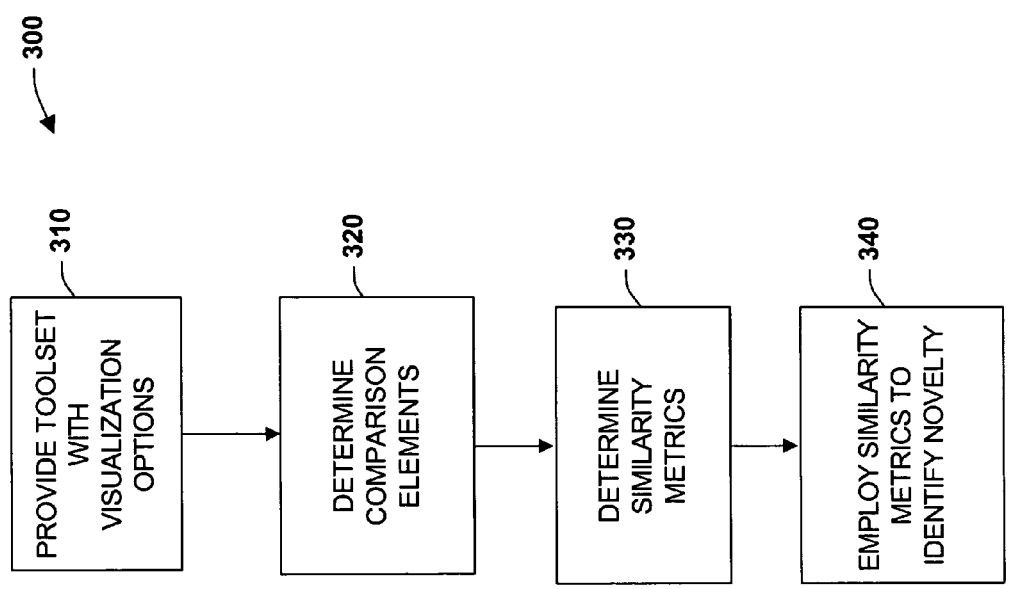
FIG. 3 is a flow diagram illustrating an information novelty process in accordance with an aspect of the present invention.

FIG. 3 is a methodology 300 illustrating a process of characterizing novelty in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 310, various tools are developed to implement and test algorithm performance. One such software toolset is named "NewsJunkie" that implements a collection of algorithms and a number of visualization options for comparing text collections. NewsJunkie represents documents as a set of words augmented with named entities extracted from the text. Common extraction tools were also used for this purpose, which identified names of people, organizations and geographical locations.

At 320, elements to be compared within documents are determined. In general, document groups contain documents with some common property, and constitute the basic unit of comparison. Examples of such common properties can be a particular topic or source of news (e.g., blackout stories coming from the East Coast news agencies). Inferences are drawn about the differences between document groups by building a model for each group, and then comparing the models using a similarity metric as described below. To facilitate exploring a variety of models, NewsJunkie represents documents either as smoothed probability distributions over all the features (words+named entities), or as vectors of weighted features (in the same feature space). Weights can be assigned by the popular family of TF.IDF functions which use components representing the frequency of term occurrence in a document and the inverse frequency of term occurrence across documents. Probabilistic weighting functions can also be used. Different smoothing options can also be implemented to improve the term weighting estimates. For example, Laplace's law of succession, or linear smoothing with word probabilities in the entire text collection; the latter option was used throughout the experiments described below. It is noted that more than one smoothing option can be implemented within the system.

At 330 of FIG. 3, similarity metrics are determined for determining differences between information items such as a document or text. A common situation occurs where something interesting happens in the world, and the event is picked up by the news media. If the event is of sufficient public interest, the ensuing developments are tracked in the news as well. Suppose an initial report is read and, at some later time, users are interested in catching up with the story. In the presence of Internet sites that aggregate thousands of news sources, the user's acute information-seeking goal can be satisfied in many ways and with many more updates than even the most avid news junkie has the time to review. Automated tools for sifting through a large quantity of documents on a topic that work to identify elements of genuinely new information can provide great value.

Thus, avoiding redundancy and overlap can help minimize the overhead associated with tracking news stories. Generally, there is a great deal of redundancy in news stories. For example, when new developments or investigation results are expected but no new information is yet available, news agencies often fill in the void with recaps of earlier developments until new information is available. The situation is further aggravated by the fact that many news agencies acquire part of their content from major multinational content providers such as Reuters or Associated Press. Users of news sites do not want to read every piece of information over and over again. Users are primarily interested in learning what's new. Thus, ordering news articles by novelty promises to be useful.

At 330, a number of document similarity metrics can be employed to identify documents that are most different from a given set of documents (e.g., the union of those read previously), wherein a term distance metric is defined to emphasize the fact that documents are sought that are generally most dissimilar from a set of documents.

The following distance metrics can be implemented:

Kullback-Leibler (KL) divergence, a classical asymmetric information-theoretic measure. Assume computing the distance between a document d and a set of documents R. Denote the probabilistic distributions of words (and named entities if available) in d (a document) and R (a set of documents) by $p_d$ and $p_R$, respectively. Then, $$dist_{KL}(p_d; p_R) = \sum_{w \in words(\{d\} \cup R)} p_d(w) \log \frac{p_d(w)}{p_R(w)}.$$

Note that the computation of $$\log \frac{p_d(w)}{p_R(w)}$$

requires both distributions to be smoothed to mitigate zero values (corresponding to words that appear in d but not in R, or vice versa).

Jensen-Shannon (JS) divergence, a symmetric variant of the KL divergence. Using the definitions of the previous item, $$dist_{JS}(p_d, p_R) = \frac{dist_{KL}(p_d, q) + dist_{KL}(p_R, q)}{2},$$

where $$q = \frac{p_d + p_R}{2}.$$

Cosine of vectors of raw probabilities (computation does not require smoothed probabilities).

Cosine of vectors of TF.IDF feature weights.

A custom metric formulated to measure the density of previously unseen named entities in an article (referred as NE). The intuition for this metric is based on a conjecture that novel information is often conveyed through the introduction of new named entities, such as the names of people, organizations, and places. The NE metric can be defined as follows: Let NE(R) be a set of named entities found in a set of documents R. Let $NE_u(R_1;R_2)$ be a set of unique named entities found in the set of documents $R_1$ and not found in the set $R_2$. That is, $NE_u(R_1;R_2)=\{ele \in NE(R_1) \wedge e \notin NE(R_2)\}$. Then, $dist_{NE}(d;R)=NE_u(\{d\},R)/length(d)$.

Normalization by document length is typically essential, as, without normalization the NE score will tend to rise with length, because of the probabilistic influence of length on seeing additional named entities; the longer the document is, the higher the chance it contains more named entities.

At 340 of FIG. 3, the distance metrics can be harnessed to identify novel information content for presentation to users. In the NewsJunkie application, a novelty ranking algorithm is applied iteratively to produce a small set of articles that a reader may be interested in. A greedy, incremental analysis is employed. The algorithm initially compares substantially all the available updates to a seed story that the user has read, and selects the article least similar to it. This article is then added to the seed story (forming a group of two documents), and the algorithm looks for the next update most dissimilar to these articles combined, and so on. The pseudocode for the ranking algorithm is outlined below in Algorithm RANKNEWSBYNOVELTY.

Algorithm RANKNEWSBYNOVELTY (dist, seed, D, n)

Algorithm RANKNEWSBYNOVELTY (dist, seed, D, n)

R←seed//initialization for i=1 to min(n, |D|) do d←argmax$_{d_i}$ ∈D {dist(d$_i$,R)}

R←R∪{d};D←D\{d} where dist is the distance metric, seed—seed story, D—a set of relevant updates, n—the desired number of updates to select, R—list of articles ordered by novelty.

To validate the algorithm and distance metrics presented above, an experiment was conducted that asked subjects to evaluate sets of news articles ordered by a variety of distance metrics.

For the experiments described herein a live news feed which aggregates news articles from over 4000 Internet sources was employed. A newsfeed from Moreover Technologies was used, although any other news or RSS feed could be employed. A clustering algorithm was used to group stories discussing the same events (called topics in the sequel). Twelve clusters were used that correspond to topics reported in the news in mid-September 2003. The 12 topics covered news reports over a time span of 2 to 9 days, and represented between 36 and 328 articles. Topics included coverage of a new outbreak of SARS in Singapore, the California governor recall, the Pope's visit to Slovenia, and so forth.

Generally, judging novelty is a subjective task. One way to obtain statistically meaningful results is to average the judgments of a set of users. In order to compare different novelty-ranking metrics, participants were asked to read several sets of articles ordered by alternate metrics, and to decide which sets carried the most novel information. Note that this scenario generally requires the evaluators to keep in mind all the article sets they read until they rate them. Since it is difficult to keep several sets of articles on an unfamiliar topic in memory, the experiment was limited to evaluating the following three metrics:

1. The KL divergence was selected due to its appealing information-theoretic basis (KL).
2. The metric counting named entities was selected as a linguistically motivated alternative (NE).
3. The chronological ordering of articles was used as a baseline (ORG).

For each of the 12 topics, the first story was selected as the seed story, and used the three metrics described above to order the rest of the stories by novelty using the algorithm RANKNEWSBYNOVELTY. The algorithm first selects the most novel article relative to the seed story. This article is then added to the seed story to form a new model of what the user is familiar with, and the next most novel article selected. Three articles were selected in this manner for each of the three metrics and each of the 12 topics. For each topic, the subjects were first asked to read the seed story to get background about the topic. They were then shown the three sets of articles (each set chosen by one of the metrics), and asked to rate the sets from most novel to least novel set.

They were instructed to think of the task as identifying the set of articles that they would choose for a friend who had reviewed the seed story, and now desired to learn what was new. The presentation order of the sets generated by the three metrics was randomized across participants.

Figure 4:
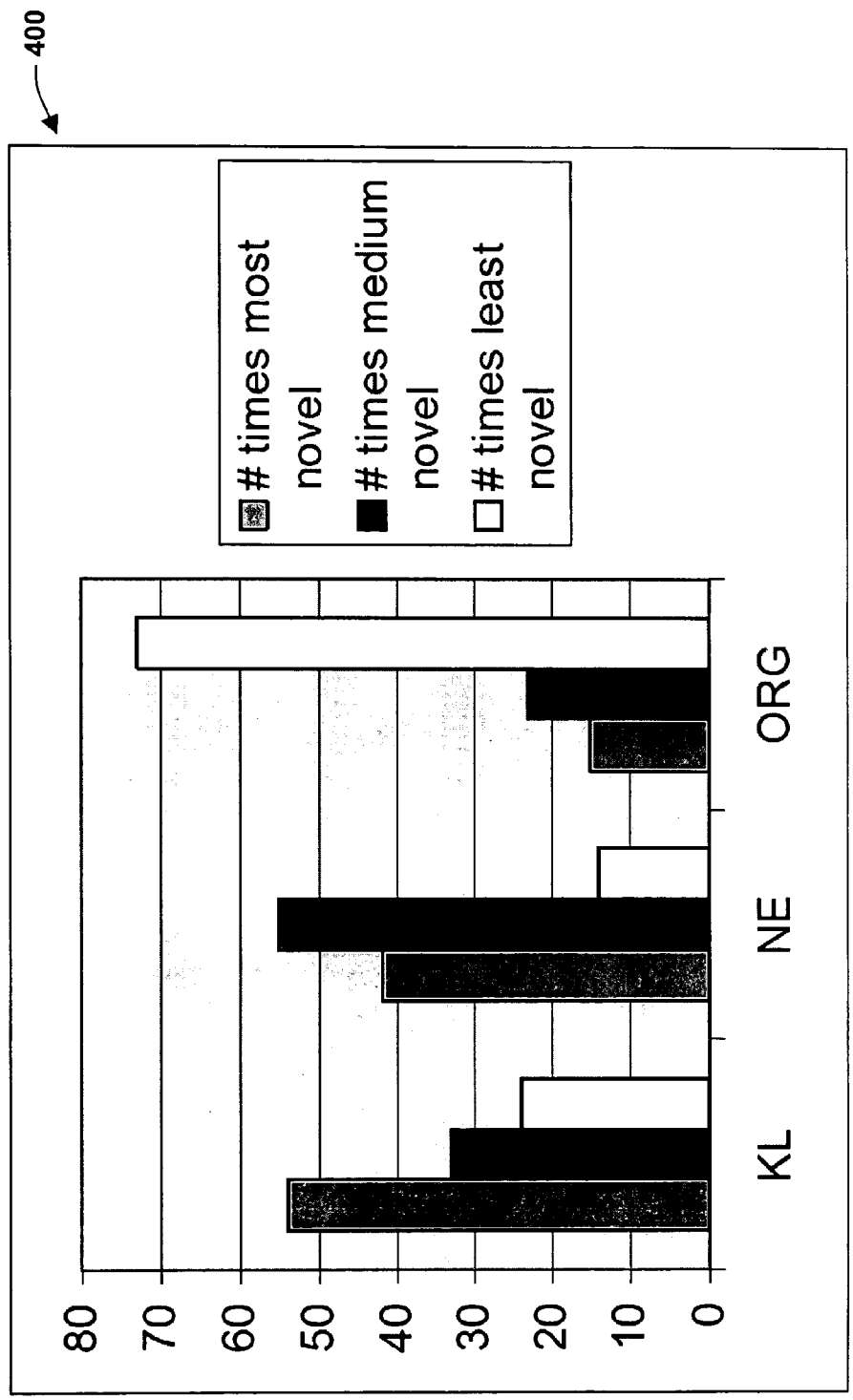
FIG. 4 is a diagram illustrating results ranking in accordance with an aspect of the present invention.

FIG. 4 is a graph 400 illustrating results ranking in accordance with an aspect of the present invention. Overall, 111 user judgments on 12 topics were obtained, averaging 9-10 judgments per topic. FIG. 4 shows the number of times each metric was rated the most, medium and least novel. As can be observed from the graph 400, the sets generated by the KL and NE metrics were rated more novel than those produced by the baseline metric (ORG).

TABLE 1

Results by topic.

| Topic id | Topic description | # times most novel | | | Mean rank | | |
|---|---|---|---|---|---|---|---|
| | | KL | NE | ORG | KL | NE | ORG |
| topic 1 | Pizza robbery | 5 | 4 | 1 | 1.7 | 1.6 | 2.7 |
| topic 2 | RIAA sues MP3 users | 2 | 7 | 0 | 1.8 | 1.2 | 3.0 |
| topic 3 | Sharon visits India | 2 | 3 | 4 | 2.6 | 1.7 | 1.8 |
| topic 4 | Pope visits Slovakia | 9 | 0 | 0 | 1.0 | 2.2 | 2.8 |
| topic 5 | Swedish FM killed | 5 | 4 | 0 | 1.4 | 1.6 | 3.0 |
| topic 6 | Al-Qaeda | 8 | 1 | 0 | 1.1 | 2.1 | 2.8 |
| topic 7 | CA governor recall | 4 | 2 | 3 | 1.7 | 2.2 | 2.1 |
| topic 8 | MS bugs | 3 | 5 | 1 | 1.9 | 1.6 | 2.6 |
| topic 9 | SARS in Singapore | 7 | 1 | 1 | 1.3 | 2.0 | 2.7 |
| topic 10 | Iran develops A-bomb | 3 | 5 | 2 | 2.2 | 1.7 | 2.1 |
| topic 11 | NASA investigation | 2 | 5 | 3 | 2.1 | 1.6 | 2.3 |
| topic 12 | Hurricane Isabel | 4 | 5 | 0 | 1.9 | 1.6 | 2.6 |

Table 1 presents per-topic results. The three penultimate columns show the number of times each metric was rated the most novel for each topic. The last three columns show mean ranks of the metrics, assuming the most novel is assigned the rank of 1, medium novel—2, and least novel—3. A Wilcoxon Signed Ranks Test was employed to assess the statistical significance of experimental results. Comparing the mean ranks of metrics across all the topics (as summarized in FIG. 4), both KL and NE were found superior to ORG at $p<0.001$. Considering individual per-topic results, the ORG metric did not achieve the lowest (=best) rank of all three metrics. In 6 cases (topics 2, 4, 5, 6, 9, 12), the difference in mean rank between ORG and the lowest-scoring metric was statistically significant at $p<0.05$, and in one additional case the significance was borderline at $p=0.068$ (topic 8). Comparing the two best metrics (KL vs. NE), the difference in favor of KL was statistically significant at $p<0:05$ for topics 4 and 6, and borderline significant ($p=0.083$) for topic 9. The difference in mean ranks in favor of NE was borderline significant for topics 2 and 3 ($p=0.096$ and $p=0.057$, respectively).

Figure 5:
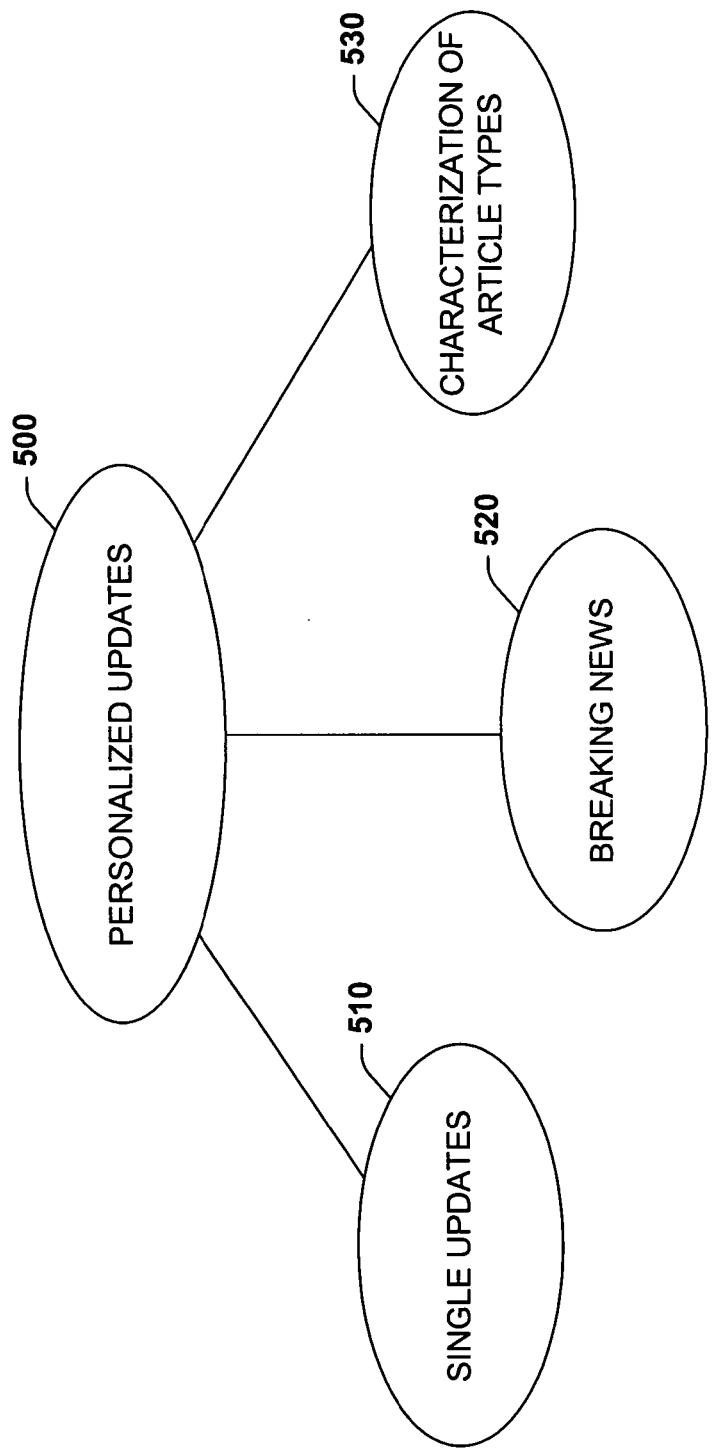
FIG. 5 illustrates a personalized update process in accordance with an aspect of the present invention.

FIG. 5 illustrates a personalized update process 500 in accordance with an aspect of the present invention. The algorithm RankNewsByNovelty presented and evaluated in the previous section tends to work under the assumption that a user wants to catch up with latest story developments some time after initially reading about it. In this case, the algorithm orders the recent articles by their novelty compared to the seed story, and then the user can read a number of highest-scoring articles depending on how much spare time he or she can allocate for the reading.

However, what if the user wants to be updated continuously as the new developments actually happen? Logistic support such as a collection server would keep track of the articles the user reads in order to estimate the novelty of the new articles streaming in the news or information feed. Based on user's personal preferences, for example, how often the user is interested in getting updates on the story, the server decides which articles to display. Therefore, an online decision mechanism can be provided that determines whether an article contains sufficiently new information to warrant its delivery to the user. In a more general analysis of the benefits versus the costs of alerting, there are opportunities to balance the informational value of particular articles or groups of articles with the cost of interrupting users, based on a consideration of their context.

In what follows, different scenarios of updating users with current news are discussed. In a single scenario update at 510, the system assumes the user is interested in getting periodic updates, while the second scenario updates the user continuously by monitoring incoming news for bursts of novel information at 520. Also, a mechanism can be provided that allows users to control the type of the novelty (as described below in more detail) of articles they desire to be updated about and illustrated as characterization of articles by type at 530.

With respect to single updates at 510, consider a case when the user wants to see no more than a periodic update on the story. One way to achieve this goal would be to use an algorithm similar to RankNewsByNovelty, that is, accumulate the stories received on all the preceding days, and assess the novelty of each new story that arrived today by computing its distance from the accumulated set. One problem with this approach is that the more stories are pooled, the less significant becomes the distance from any new story to the pool. After several days worth of articles have been accumulated, even a major update will be seen as barely new.

To avoid this pitfall, the original novelty algorithm is modified as shown below relating to pick a periodic update. As a concrete example, a period of a day was used, so the algorithm identifies daily updates for a user. Given the user and their choice of the topic to track, algorithm PickDailyUpdate compares the articles received today with the union of all the articles received the day before. The algorithm attempts to select the most informative update compared to what was known yesterday, and shows it to the user, provided that the update carries enough new information (i.e., its estimated novelty is above the user's personalized threshold). Such conditioning endows the system with the ability to relay to the user informative updates and to filter out articles that only recap previously known details. The algorithm can be generalized to identify n most informative updates per day.

It could be argued that by ignoring all the days before the immediately preceding one, algorithm PickDailyUpdate might also consider novel those articles that recap what was said several days ago. In practice this rarely happens, as most of the articles are written in the way that interleaves new information with some background on previous developments. As can be appreciated, more elaborate distance metrics can be provided that consider all previous articles relevant to the topic but decay their weight with age.

Algorithm PickDailyUpdate (dist, Bg, D, thresh)

$d \leftarrow \arg\max_{d_i \in D}\{dist(d_i, Bg)\}$ if dist(d, Bg)>thresh then display(d)

Bg←D where dist is the distance metric, Bg—the background reference set (union of the relevant articles received on the preceding day), D—a set of new articles received today, thresh—user-defined sensitivity threshold.

The algorithm presented above at 510 can be largely an "offline" procedure, as it updates users at predefined time intervals. Hardcore news junkies may find it frustrating to wait for daily scheduled news updates. For some, a more responsive form of analysis may be desired.

In the extreme case, comparing every article to the preceding one may not work well, as the system may potentially predict nearly every article as novel. Instead, breaking news events may be processed at 520 of FIG. 5 where a sliding window is used covering a number of preceding articles to estimate the novelty of the current one. It is noted that estimating distances between articles and a preceding window of fixed-length facilitates the comparison of scores, and different window lengths of 20-60 articles were evaluated. It was found that lengths of approximately 40 typically worked well in practice.

In contrast to the algorithm PickDailyUpdate, the background reference set now becomes much shorter, namely, 40 articles instead of a full day's content. This increases the likelihood that the window is not long enough to cover delayed reports and recaps that follow long after the story was initially reported. In order to filter out such repetitions, the nature of news reports should be understood.

When an event or information update about an event of importance occurs, many news sources pick up the new development and report it within a fairly short time frame. If one successively plots the distance between each article and the preceding window, such arrival of new information will result in peaks in a graph. Such peaks are referred to as a burst of novelty. At the beginning of each burst, additional articles tend to add new details causing the graph to rise. As time passes, the sliding window covers more and more articles conveying this recent development and the following articles do not have the same novelty; as a result, the computed novelty heads downward signifying the end of the burst.

Delayed reports of events as well as recaps on a story are less likely to be correlated in time between different sources. Such reports may appear novel compared to the preceding window, but since they are usually isolated they usually cause narrow spikes in novelty. In order to discard such standalone spikes and not to admit them as genuine updates, a novelty signal should be filtered appropriately.

A median filter provides this functionality by reducing the amount of noise in the signal. The filter successively considers each data point in the signal and adapts it to better resemble its surroundings, effectively smoothing the original signal and removing outliers. Specifically, a median filter of width w first sorts w data points within the window centered on the current point, and then replaces the latter with the median value of these points.

After computing the distance between articles and a sliding window covering the preceding ones, the resultant signal is passed through a median filter. Considered filters include widths of 3-7, for example; the filter of width 5 appears to work well in the majority of cases.

Algorithm IdentifyBreakingNews (dist; D; l; fw; thresh)

Window $\leftarrow \bigcup_{i=1}^{l} d_i \in D$ for i = l + 1 to |D| do $Scores_i \leftarrow dist(d_i, Window)$ Window ← (Window\\$d_{i-1}$) $\cup d_i$ $Scores^{filt} \leftarrow$ MedianFilter(Scores, fw)

for j = 1 to |$Scores^{filt}$| do if $Scores_j^{filt}$ > thresh then display($d_{j+1}$)

skip to the beginning of the next burst where dist is the distance metric, D—a sequence of relevant articles, l—sliding window length, fw—median filter width, thresh—user-defined sensitivity threshold.

It is noted that the use of a median filter may delay the routing of novel articles to users, since several following articles may need to be considered to reliably detect the beginning of a new burst. However, it was found that such delays are rather small (half the width of the median filter used), and the utility of the filter more than compensates for this inconvenience. If users are willing to tolerate some additional delay, the algorithm can scan forward several dozens of articles from the moment a burst is detected, in order to select the most informative update instead of simply picking the one that starts the burst. Combination approaches are also feasible such as the rendering of an early update on breaking news, and then waiting for a more informed burst analysis to send the best article on the development. The algorithm above shows the pseudocode for IdentifyBreakingNews that implements burst analysis for news alerting.

Figure 6:
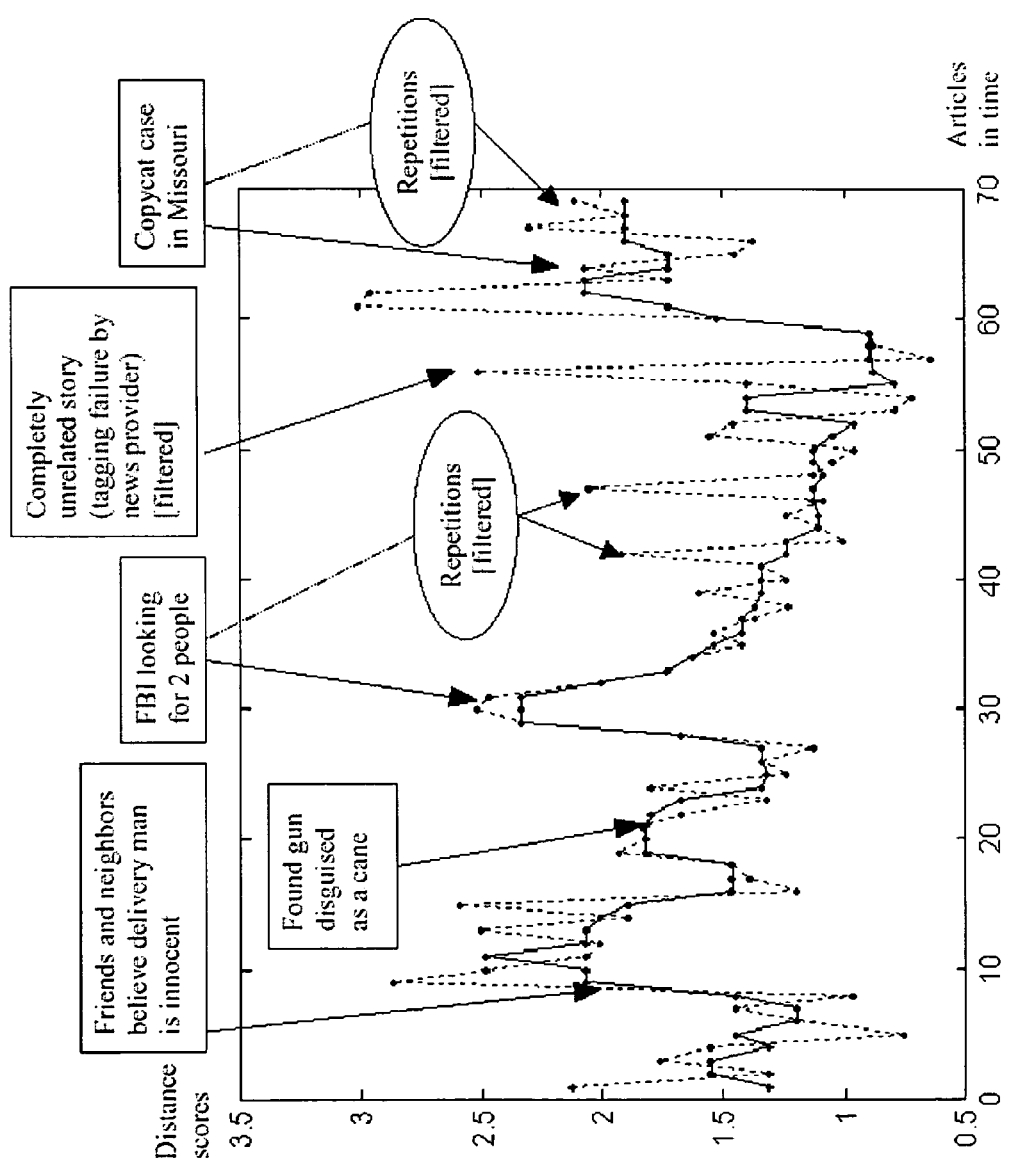
FIG. 6 illustrates novelty signals in accordance with an aspect of the present invention.

FIG. 6 shows the application of the algorithm IdentifyBreakingNews to a sample topic. The topic in question is devoted to a bank robbery case in Erie, Pa., USA, where a group of criminals apparently seized a pizza delivery man, locked a bomb device to his neck and, according to statements made by the delivery man, forced him to rob a local bank. The man was promptly apprehended by police, but soon afterwards the device detonated and killed him. The bizarre initial story and ensuing investigation were tracked by many news sources for several weeks starting in September 2003. The x-axis of the figure corresponds to the sequence of articles as they arrived in time, and the y-axis plots (raw and median-filtered) distance values for each article given the preceding sliding window. Raw distance scores are represented by a dotted line, and filtered scores are plotted with a solid line. The text boxes accompanying FIG. 6 comment on the actual events that correspond to the identified novelty bursts, and show which potentially spurious peaks have been discarded by the filter. The smoothed novelty score, which incorporates the median filter, captures the main developments in the story (interviews with friends, details about the weapon, FBI bulletin for two suspects, and a copycat case), while at the same time filtering out spurious peaks of novelty.

Referring back to 530 of FIG. 5, characterization of article types and user controls are considered. In some cases, novelty scores alone should not be relied upon as a sole selection criterion; some articles are identified as novel by virtue a change in topic. To further refine the analysis of informational novelty, a classification of types of novelty is formulated, based on different relationships between an article and a seed story or topic of interest. Examples of these classes of relationships include:

1. Recap articles are those that are relevant, but generally only offer reviews of what has already been reported and carry little new information.

2. Elaboration articles add new, relevant information on the topic set forth by the seed article.

3. Offshoot articles are also relevant to the mainstream discussion, but the new information they add is sufficiently different from that reported in the seed story to warrant the development of a new related topic.

4. Irrelevant articles are those that are far off the topic of interest. They can arise because of clustering or parsing issues. It is noted that more than four categories can be defined and processed.

Of these classes, relationship types 2 and 3 are probably what most users want to see when they are tracking a topic. To achieve this goal, a new type of document analysis can be provided that scrutinizes intra-document dynamics. As opposed to previous types of analysis that compared entire documents to one another, this technique "zooms into" documents estimating the relevance of their parts.

In general, a model is constructed for every document, and a fixed distance metric is used, e.g., KL divergence. Then, for each document, a distance score, of a sliding window of words within the document versus the seed story, is computed. The score of a window of words can be construed as a sum of point-wise scores of each word in the window vs. the seed story, as stipulated by comparing the model of the within document window with that of the seed story using the selected metric. Several different window lengths were considered, and the value of 20 was found to work well in practice.

A useful property of this technique is that it goes beyond the proverbial bag of words, and considers the document words in their original context. It was opted for using sliding contextual windows rather than apparently more appealing paragraph units, since using a fixed-length window makes distance scores directly comparable. Another obvious choice of the comparison unit would be individual sentences. However, it was believed that performing this analysis at the sentence level would consider too little information, and the range of possible scores would be too large to be useful.

Figure 7:
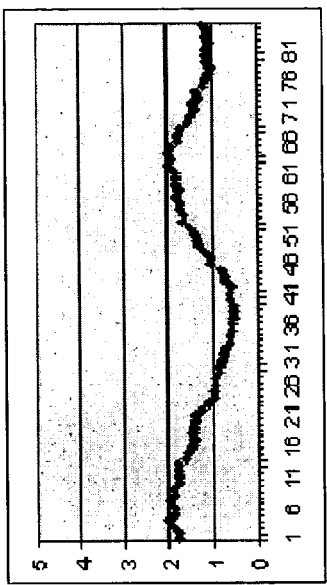
FIG. 7 illustrates example relationships of articles in accordance with an aspect of the present invention.
Figure 7:
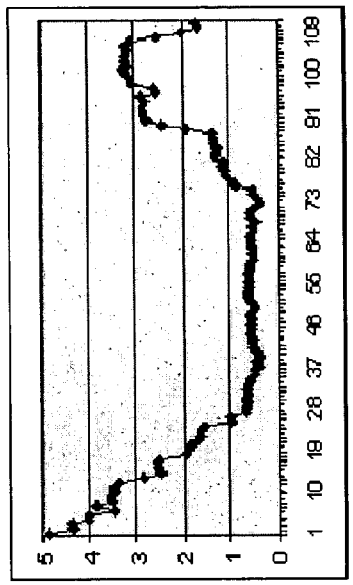
Figure 7:
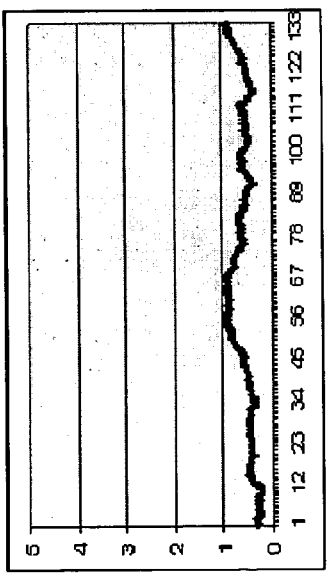
Figure 7:
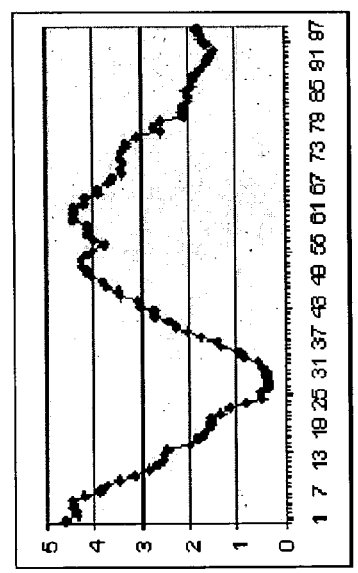

FIG. 7 shows sample results of intra-document analysis. A seed story for this analysis was a report on a new case of SARS in Singapore. Articles that mostly recap what has already been said typically have a very limited dynamic range and low absolute scores. Elaboration articles usually have higher absolute scores that reflect the new information they carry. One elaboration for this story reported that the patient's wife was being held under quarantine. Further along this spectrum, articles that may qualify as offshoots but are still anchored to the events described in the seed story have a much wider dynamic range. One offshoot was a story that focused on the impact of SARS on the Asian stock market, and another was on progress on a SARS vaccine. Both offshoot articles used the recent case as a starting point, but were really about a related topic. It is believed that analyzing intra-document dynamics such as the dynamic range and patterns of novelty scores are useful in identifying different types of information that readers would like to follow.

The Web has been providing users with a rich set of news sources. It is deceptively easy for Internet surfers to browse multitudes of sources in pursuit of news updates, yet sifting through large quantities of news can involve the reading of large quantities of redundant material. A collection of algorithms have been presented that analyze news feeds and identify articles that carry most novel information given a model of what the user has read before. To this end, a word-based representation has been extended with named entities extracted from the text. Using this representation a variety of distance metrics are employed to estimate the dissimilarity between each news article and a collection of articles (e.g., previously read stories). The techniques underlying the algorithms analyze inter- and intra-document dynamics by studying how the delivery of information evolves over time from article to article, as well as within each individual article at the level of contextual word windows.

News browsers or server-based services incorporating these algorithms can offer users a personalized news experience, giving users the ability to tune both the desired frequency of news updates and the degree to which these updates should be similar to the seed story, via exercising control over the novelty constraint. More sophisticated distance metrics can be provided that incorporate some of the basic metrics described herein, as well as more detailed profiles of within-document patterns.

Figure 8:
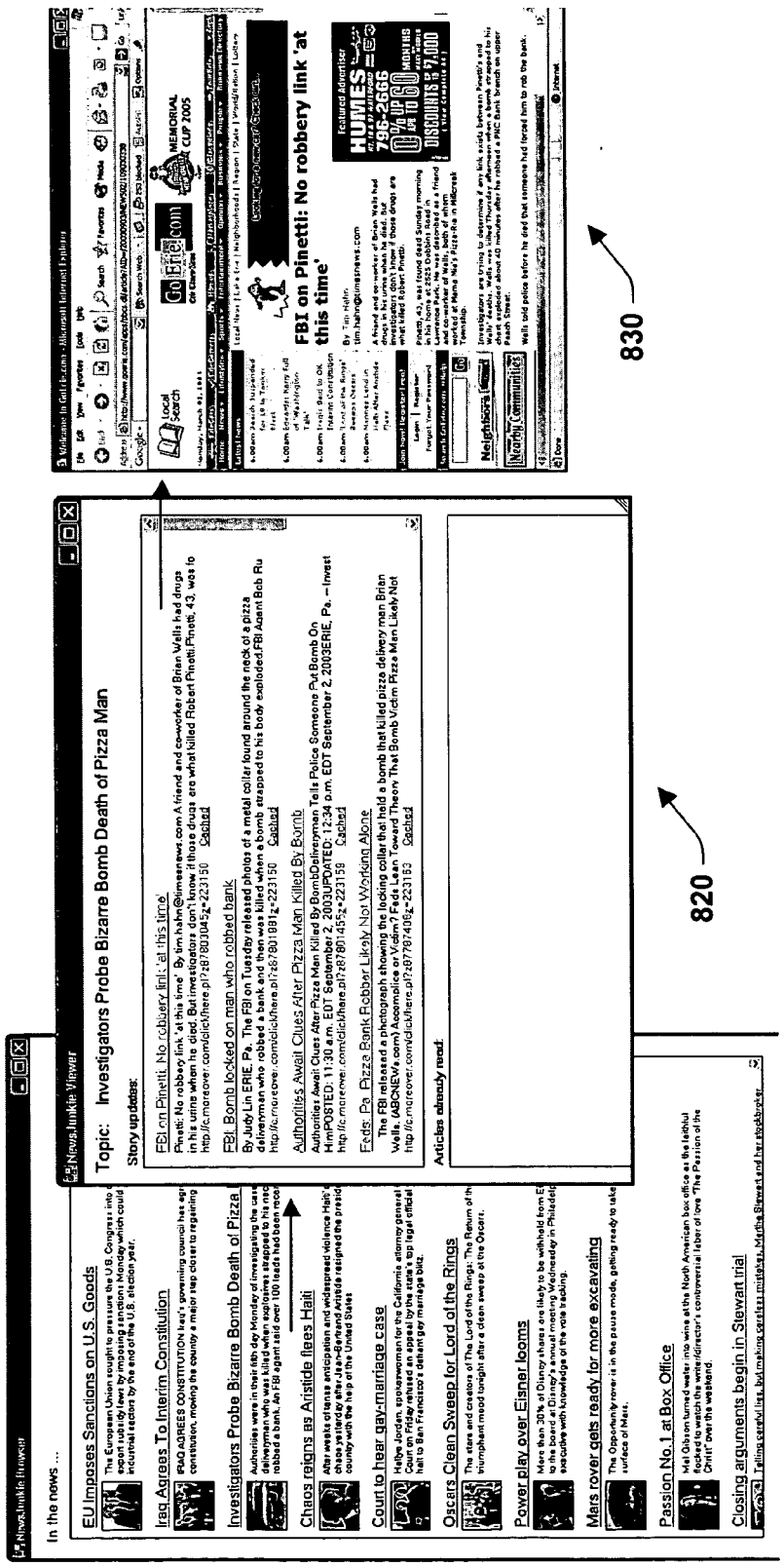
Figure 9:
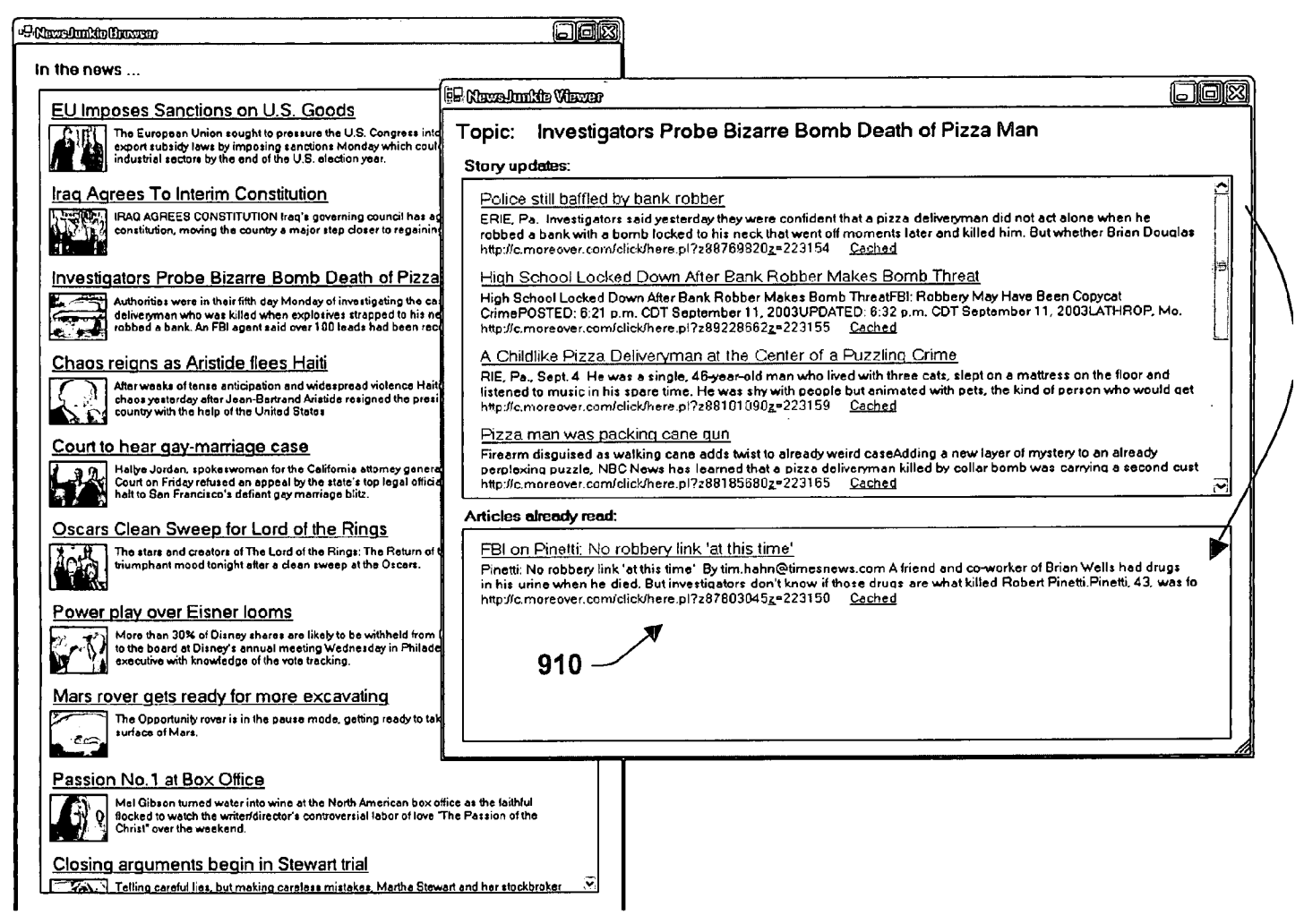
Figure 10:
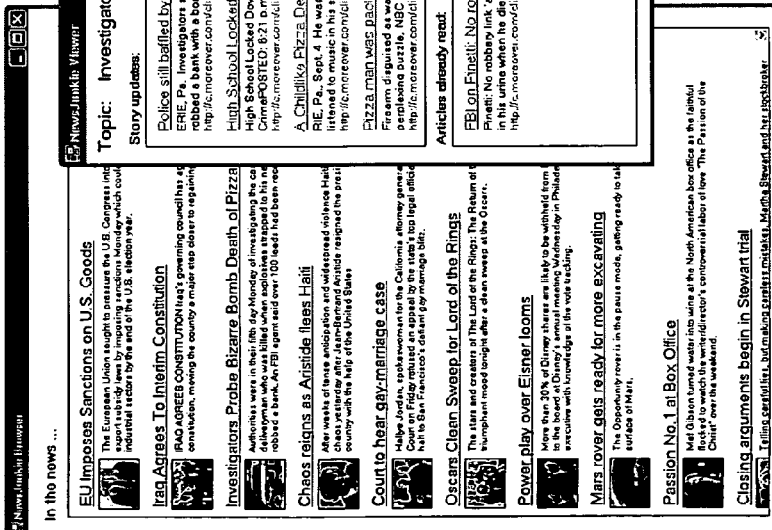
Figure 11:
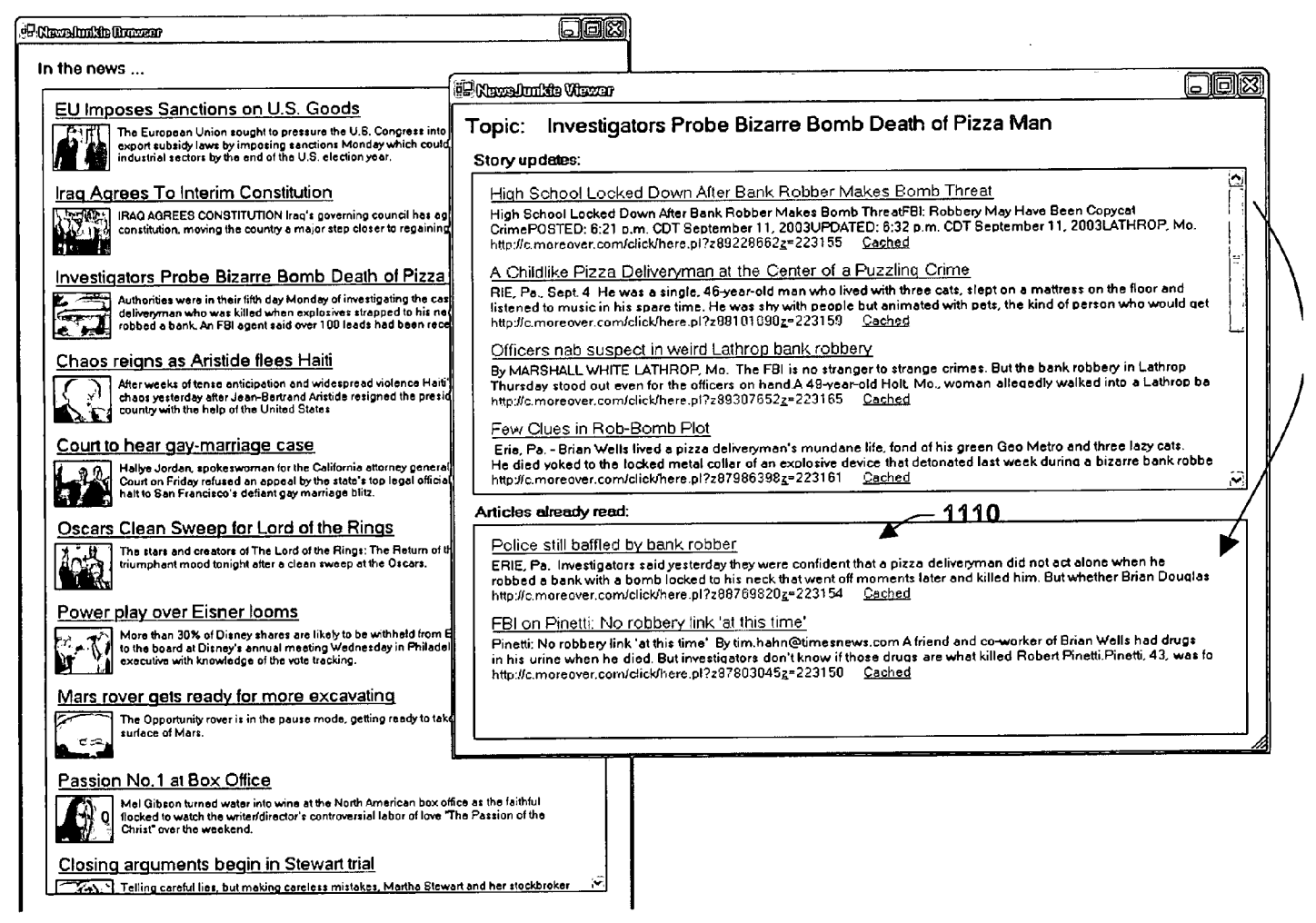

FIGS. 8-11 illustrate example user interfaces in accordance with an aspect of the present invention. FIG. 8 illustrates a list of news stories at 810, wherein a particular topic is selected from the news stories at 810 and displayed at 820 (e.g., Investigators Probe . . . ). When a topic is selected at 810, the display 820 displays news items of interest relating to the selected topic. At 830, a particular news item is displayed which is selected from the list at 820. FIG. 9 illustrates that after a topic is selected, it can be listed under an already read section at 910. FIG. 10 illustrates how a subsequent novel article appears at 1010 that is then inspected or read at 1020. FIG. 11 shows how the read item of 1020 is then placed into an already read location at 1110.

Figure 12:
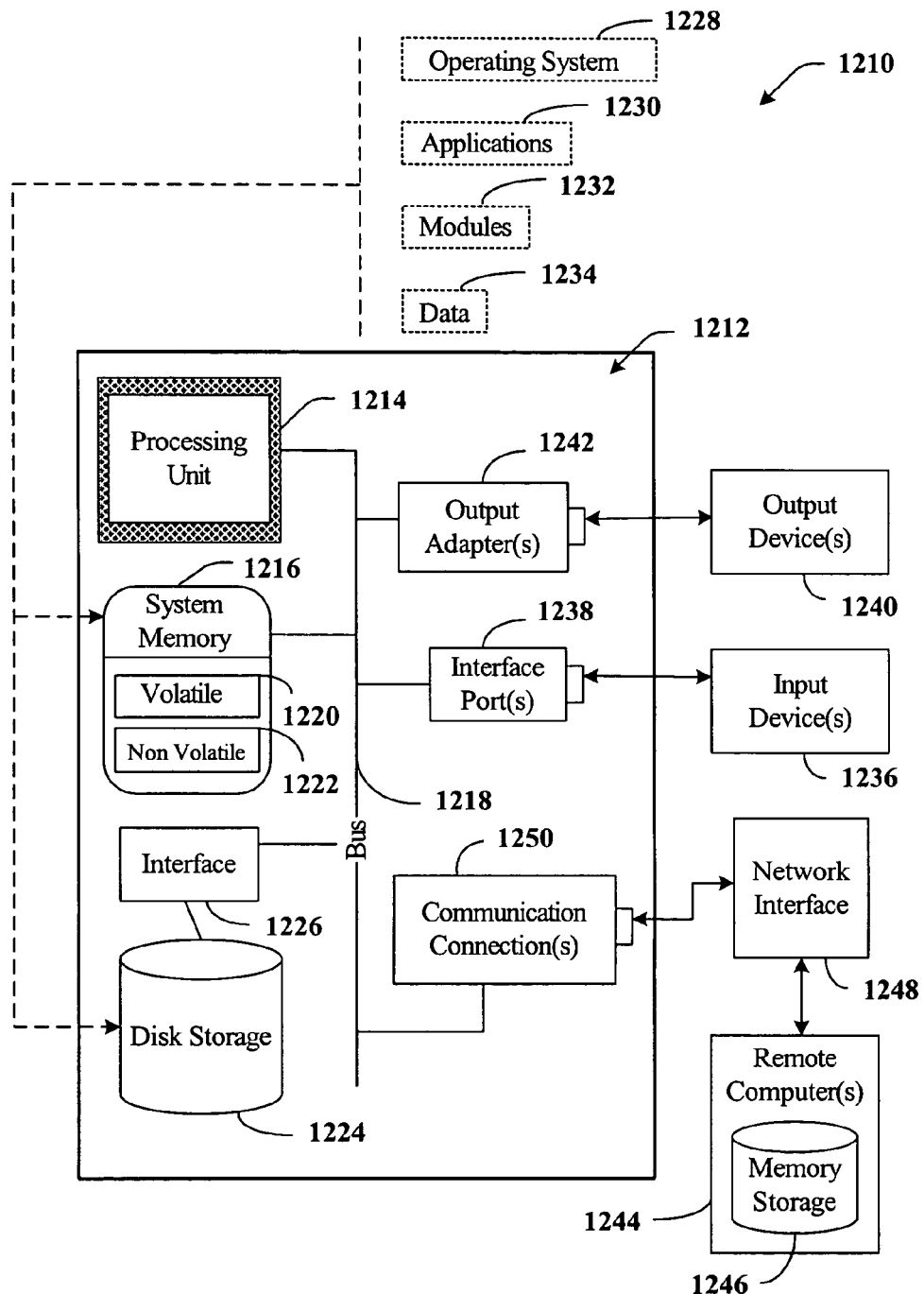
FIG. 12 is a schematic block diagram illustrating a suitable operating environment in accordance with an aspect of the present invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
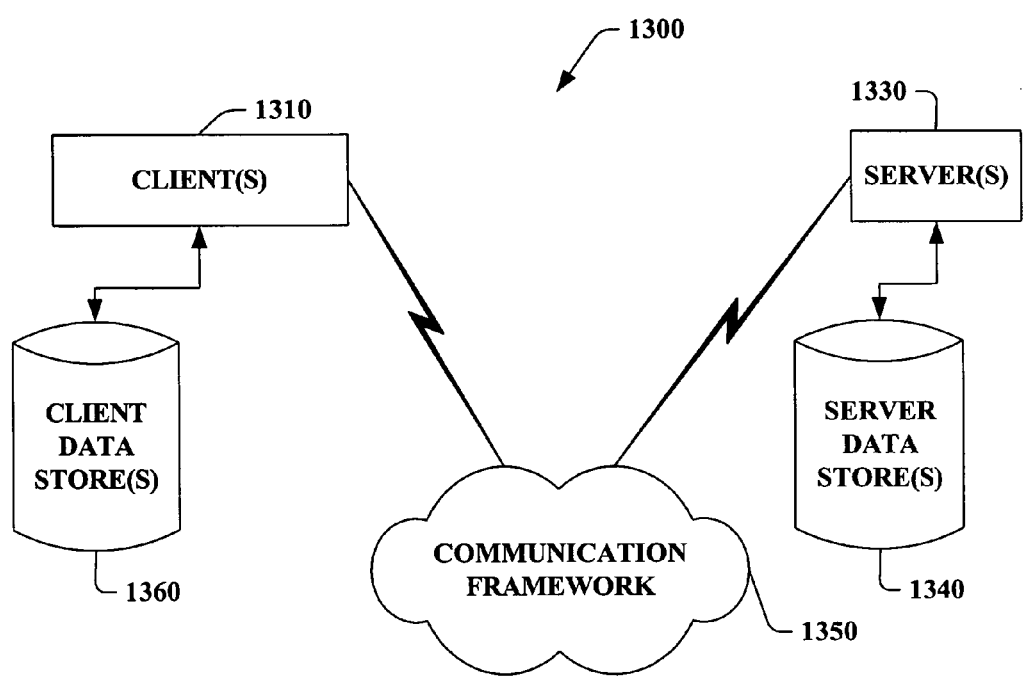
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system for distributing personalized information, comprising:

a comparator that determines differences between two or more related information items, and an analyzer that automatically determines a subset of the related information items as personalized information based in part on the differences and as data relating to the information items evolves over time and at least one of:
  stores the personalized information in a computer storage medium; or
  displays the personalized information on an output device,
wherein the personalized information adds maximum novel information to the subset of the related information, and
wherein the subset of information items is at least one of stored in a computer storage medium or displayed on an output device and the analyzer employs the following algorithm:

Algorithm RankNewsByNovelty (dist, seed, D, n)

R←seed//initialization for i=1 to min(n, |D|) do d←argmax$_{d_i}$ ∈D {dist($d_i$,R)}

R←R∪{d};D←D\{d} where dist is a distance metric, seed—seed story, D—a set of relevant updates, d—document, n—desired number of updates to select and R—list of articles ordered by novelty.

2. The system of claim 1, farther comprising a filter to discard previously observed information.

3. The system of claim 1, the information items relate to a news stream.

4. The system of claim 1, further comprising at least one server to collect the information items for farther processing by the analyzer.

5. The system of claim 1, the comparator processes detailed statistics gathered on word occurrence across sets of documents in order to characterize differences and similarities among the sets.

6. The system of claim 1, further comprising a word model that employs named entities that denote people, organizations, or geographical locations.

7. The system of claim 1, further comprising a personalized news portal or news alerting service that seeks to minimize the time and disruptions to users.

8. The system of claim 1, further comprising a framework for determining differences in a variety of applications, including automatic profiling and comparison of text collections, automatic identification of different views, scopes and interests reflected in the texts, or automatic identification of novel information.

9. The system of claim 1, the comparator determines at least one of a difference in content, a difference in structural organization, and a difference in time.

10. The system of claim 9, further comprising a component for characterizing novelty in news stories and allowing ordering of news articles so that each article adds maximum information to a union of previously read articles.

11. The system of claim 9, for comprising a component for analyzing topic evolution over time to enable quantifying importance and relevance of news updates.

12. The system of claim 11, further comprising providing user controls for topic parameters in order provide a personalized news experience.

13. A computer readable medium having computer readable instructions stored thereon for implementing the components of claim 1.

14. A method for creating personalized information, comprising:
  automatically analyzing documents from different information sources;
  automatically determining novelty of the documents;
  creating a personalized feed of information based on the novelty of the documents by implementing at least the following algorithm; and
  at least one of storing or displaying the personalized feed,
    wherein the personalized feed of information is at least one of stored in a computer storage medium or displayed on an output device and the analyzer employs the following algorithm:

Algorithm RankNewsByNovelty (dist, seed, D, n)

R←seed//initialization for i=1 to min(n, |D|) do d←argmax$_{d_i}$ ∈D {dist($d_i$,R)}

R←R∪{d};D←D\{d} where dist is a distance metric, seed—seed story, D—a set of relevant updates, d—document, n—desired number of updates to select and R—list of articles ordered by novelty.

15. The method of claim 14, farther comprising inferring differences between document groups by building a model for each group, and then comparing the models using a similarity metric.

16. The method of claim 15, the models employ smoothed probability distributions over word features or as vectors of weights in the same feature space.

17. The method of claim 15, the similarity metric farther comprising at least one of a KL divergence, a JS divergence, a cosine of vectors computation, a cosine of vectors of feature weights, and a measure of density of previously unseen named entities.

18. The method of claim 17, further comprising providing a novelty ranking algorithm that is applied iteratively to produce a small set of articles that a reader is potentially interested in.

19. The method of claim 18, further comprising employing a greedy incremental analysis and comparing available updates to a seed story that a user has read, selecting the article least similar to the seed story.

20. The method of claim 19, further comprising providing a general analysis of benefits versus the costs of alerting users to balance the informational value of particular articles or groups of articles with the cost of interrupting users, based on a consideration of the user's context.

21. The method of claim 19, further comprising comparing articles received in one period with a union of articles received periodically.

22. The method of claim 21, further comprising determining distance metrics that consider previous articles relevant to a topic but decay the metrics weight with age.

23. The method of claim 19, further comprising the following algorithm:

Algorithm P$_{\text{ICK}}$D$_{\text{AILY}}$U$_{\text{PDATE}}$ (dist, Bg, D, thresh)

d←arg max$_{d_i}$ ∈ D{dist(d$_i$,Bg)} if dist(d, Bg)>thresh then display(d)

Bg←D where dist is a distance metric, Bg—a background reference set including a union of relevant articles received on a preceding day, D—set of new articles received today, d—document and thresh—user-defined sensitivity threshold.

24. The method of claim 19, further comprising determining a burst of novelty.

25. The method of claim 24, further comprising determining a median filter of that sorts w data points within a window centered on a current point.

26. The method of claim 25, further comprising the following algorithm:

Algorithm IDENTIFYBREAKINGNEWS (dist; D; l; fw; thresh)

Window ← $\bigcup_{i=1}^{l} d_i$ ∈ D for i = l + 1 to |D| do

Scores$_i$ ← dist(d$_i$, Window)

Window ← (Window\d$_{i-l}$) ∪ d$_i$

Scores$^{\text{filt}}$ ← MedianFilter(Scores, fw)

for j = 1 to |Scores$^{\text{filt}}$|do if Scores$^{\text{filt}}_j$ > thresh then display(d$_{j+l}$)

skip to the beginning of the next burst where dist is a distance metric, D—a sequence of relevant articles, d—document, l—sliding window length, fw—median filter width and thresh—user-defined sensitivity threshold.

27. The method of claim 19, further comprising determining at least one of recap articles, elaboration articles, offshoot articles, and irrelevant articles.

28. A method for performing a document analysis, comprising:

constructing a language model for each document in a set of documents;

analyzing the documents based at least upon determining a fixed distance metric;

sliding at least one window over words in the documents, wherein for each document a distance score of the sliding window versus a seed story is calculated and the results are passed through a median filter, the median filter identifies novel information in each; and at least one of storing or displaying the results, wherein the results are at least one of stored in a computer storage medium or displayed on an output device and the median filter comprises the following algorithm:

Algorithm R$_{\text{ANK}}$N$_{\text{EWS}}$B$_{\text{Y}}$N$_{\text{OVELTY}}$ (dist, seed, D, n)

R←seed//initialization for i=1 to min(n, |D|) do d←argmax$_{d_i}$ ∈D {dist(d$_i$,R)}

R←R∪{d};D←D\{d} where dist is a distance metric, seed—seed story, D—a set of relevant updates, d—document, n—desired number of updates to select and R—list of articles ordered by novelty.

29. The method of claim 28, farther comprising plotting distance scores of the window versus a seed story.

30. The method of claim 29, farther comprising determining a sum of point-wise scores of each word vs. the seed story as stipulated by comparing the language model of a current document with that of the seed story using a selected metric.

31. The method of claim 30, farther comprising employing a window length parameter of 20.

32. The method of claim 28, farther comprising assisting a design of ideal reading sequences or paths through currently unread news stories on a topic, within different time-horizons of recency from present time.

33. The method of claim 28, further comprising designing sequences for catching up on news, considering the most recent news as well as news bursts over time, to help people understand the evolution of news story and navigate the history of stories by major events or updates.

34. The method of claim 28, further comprising developing different types of display designs and metaphors.

35. The method of claim 34, the types include use of a time-line view or clusters in time.

36. The method of claim 28, further comprising providing ideal alerting in a desktop and or mobile setting of breaking news stories within a topic.

37. The method of claim 36, further comprising allowing users to specify topics, or key words and alerting the user when there is enough novelty given what the user has read.

38. The method of claim 36, further comprising alerting a user when a news story appears with keywords if the information novelty is above a predetermined threshold of novelty.

39. A machine implemented system for creating personalized information, comprising:

means for analyzing a plurality of documents from different information sources;

means for determining a similarity of the documents;

means for providing a personalized feed of novel information based on determined differences in similarity of the documents by implementing the following algorithm; and means for at least one of storing or displaying the personalized feed, wherein the personalized feed of information is at least one of stored in a computer storage medium or displayed on an output device and the algorithm implemented is:

Algorithm R$_{\text{ANK}}$N$_{\text{EWS}}$B$_{\text{Y}}$N$_{\text{OVELTY}}$ (dist, seed, D, n)

R←seed//initialization for i=1 to min(n, |D|) do d←argmax$_{d_i}$ ∈D {dist(d$_i$,R)}

R←R∪{d};D←D\{d} where dist is a distance metric, seed—seed story, D—a set of relevant updates, d—document, n—desired number of updates to select and R—list of articles ordered by novelty.

* * * * *